(12) United States Patent
Morita et al.

(10) Patent No.: US 9,679,698 B2
(45) Date of Patent: Jun. 13, 2017

(54) MULTI-LAYER CERAMIC CAPACITOR AND METHOD OF MANUFACTURING THE SAME

(71) Applicant: TAIYO YUDEN CO., LTD., Taito-ku, Tokyo (JP)

(72) Inventors: Koichiro Morita, Takasaki (JP); Tetsuo Shimura, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 259 days.

(21) Appl. No.: 14/389,296

(22) PCT Filed: Nov. 13, 2012

(86) PCT No.: PCT/JP2012/079422
§ 371 (c)(1),
(2) Date: Sep. 29, 2014

(87) PCT Pub. No.: WO2013/145422
PCT Pub. Date: Oct. 3, 2013

(65) Prior Publication Data
US 2015/0070817 A1    Mar. 12, 2015

(30) Foreign Application Priority Data

Mar. 30, 2012    (JP) ................. 2012-079486

(51) Int. Cl.
*H01G 4/06* (2006.01)
*C04B 35/00* (2006.01)
(Continued)

(52) U.S. Cl.
CPC ......... *H01G 4/1227* (2013.01); *C04B 35/465* (2013.01); *C04B 35/4682* (2013.01);
(Continued)

(58) Field of Classification Search
USPC .................................. 361/321.1–321.5, 311
See application file for complete search history.

(56) References Cited

U.S. PATENT DOCUMENTS 7,001,585 B2 † 2/2006 Swanson
8,771,631 B2 * 7/2014 Nakagawa ........... H01G 4/1227
423/598
(Continued)

FOREIGN PATENT DOCUMENTS

JP    2006-278615 A    10/2006
JP    2006-282483 A    10/2006
(Continued)

OTHER PUBLICATIONS

International Search Report (ISR), mailed Dec. 11, 2012, issued for International application No. PCT/JP2012/079422.
(Continued)

*Primary Examiner* — Eric Thomas
(74) *Attorney, Agent, or Firm* — Law Office of Katsuhiro Arai

(57) ABSTRACT

A multi-layer ceramic capacitor has a structure where the dispersion, nd, of average grain size of the dielectric grains constituting the dielectric layer (a value (D90/D10) obtained by dividing D90 which is a grain size including 90% cumulative abundance of grains by D10 which is a grain size including 10% cumulative abundance of grains) is smaller than 4.

11 Claims, 2 Drawing Sheets

(51) Int. Cl.
   *H01G 4/12*    (2006.01)
   *H01G 4/012*   (2006.01)
   *H01G 4/248*   (2006.01)
   *H01G 4/30*    (2006.01)
   *C04B 35/468*  (2006.01)
   *C04B 35/465*  (2006.01)

(52) U.S. Cl.
   CPC .......... *H01G 4/012* (2013.01); *H01G 4/1209* (2013.01); *H01G 4/248* (2013.01); *H01G 4/30* (2013.01); *C04B 2235/3206* (2013.01); *C04B 2235/3224* (2013.01); *C04B 2235/3236* (2013.01); *C04B 2235/3239* (2013.01); *C04B 2235/3244* (2013.01); *C04B 2235/3262* (2013.01); *C04B 2235/3418* (2013.01); *C04B 2235/5445* (2013.01); *C04B 2235/5454* (2013.01); *C04B 2235/6584* (2013.01); *C04B 2235/72* (2013.01); *C04B 2235/784* (2013.01); *C04B 2235/785* (2013.01)

(56) References Cited

U.S. PATENT DOCUMENTS

2007/0135294 A1   6/2007   Hiramatsu et al.
2011/0205686 A1   8/2011   Yamaguchi

FOREIGN PATENT DOCUMENTS

| JP | 2010-180124 A | 8/2010 |
| JP | 2011-068524 A | 4/2011 |
| JP | 2011-173747 A | 9/2011 |

OTHER PUBLICATIONS

H.J.H. Brouwers; "Particle-size distribution and packing fraction of geometric random packings"; pp. 1-14; published Sep. 26, 2006; The American Physical Society; first Erratum published Dec. 12, 2006 (p. 15); second Erratum published Nov. 18, 2011 (p. 16).†

\* cited by examiner
† cited by third party

MULTI-LAYER CERAMIC CAPACITOR AND METHOD OF MANUFACTURING THE SAME

This application is the U.S. National Phase under 35 U.S.C. §371 of International Application PCT/JP2012/079422, filed Nov. 13, 2012, which claims priority to Japanese Patent Application No. 2012-079486, filed Mar. 30, 2012. The International Application was published under PCT Article 21(2) in a language other than English.

TECHNICAL FIELD

The present invention relates to a multi-layer ceramic capacitor (MLCC) that achieves smaller size and larger capacitance through high-density layering of dielectric layers, as well as a method of manufacturing such multi-layer ceramic capacitor.

BACKGROUND ART

As mobile phones and other digital electronic devices become increasingly smaller and thinner, the need for chips that are smaller yet offering larger capacitance is increasing every year for the multi-layer ceramic capacitors (MLCC) installed on the electronic circuit boards of these devices. In general, reducing the capacitor size inevitably reduces the area of the internal electrodes facing the dielectric layers, which in turn decreases the capacitance. To make sure the capacitor has sufficient capacitance to permit use of a smaller chip, high-density layering technology is crucial that reduces the thickness of the dielectric layers to be provided between the internal electrodes and also allows for layering of many of these dielectric layers.

To increase the density of dielectric layers in a multi-layer ceramic capacitor by making them thinner, one possible way is to minimize the grain size of the primary constituent of dielectrics, such as $BaTiO_3$ (barium titanate). However, making the grain size of dielectrics finer to reduce the thickness of the dielectric layer causes the dielectric constant to drop due to the sizing effect, making it impossible for the capacitor as a whole to provide sufficient capacitance. In the field of high-density layering for ceramic capacitors, therefore, technology is adopted to sinter a fine powder of dielectrics to grow the grain size and thereby prevent the dielectric constant from dropping and consequently ensure sufficient capacitance.

According to Patent Literature 1, for example, a specific dielectric constant of 6000 or more can be achieved by adjusting to a range of 0.1 to 0.2 μm the grain size of the material powder, or specifically $Ba_{1-x}Ca_xTiO_3$ (also referred to as "BCT") which is $BaTiO_3$ partially substituted by Ca, and growing the dielectric grains to a grain size of 0.35 to 0.65 μm, in the process of reducing the thickness of the dielectric layer to approx. 1 μm. In general, Mg is added as an acceptor element to suppress the reduction of dielectrics due to sintering. In Patent Literature 1, the content of MgO in the dielectrics is 0.05 to 3.0 mol per 100 mol of $Ba_{1-x}Ca_xTiO_3$.

In addition, preferably the size of the dielectric grain is 200 nm or less in order to ensure sufficient electrical insulation property based on a dielectric layer of 1 μm or less. That is because the smaller the grain size, the larger the grain boundary becomes where movement of oxygen vacancy migration in the electrostatic field (electric field migration) is inhibited. If the grain size is large, on the other hand, the gaps between grains on the surface of the dielectric layer become deeper and the internal electrode paste will seep into these gaps to make it easier for electrode projections into the dielectric layer to form. A multi-layer ceramic capacitor is deemed equivalent to an electrical circuit comprised of individual capacitors, each constituting one dielectric layer, connected in parallel by the number of layers, and accordingly the entire capacitor will become electrically conductive if even a single dielectric layer is shorted due to concentration of electric field. Since this concentration of electric field occurring at electrode projections that generate in the gaps between grains can cause the insulation property to deteriorate and the voltage endurance to drop in the capacitor, it is desirable that the dielectric layer and interface contacted by the internal electrode be uniformly flat.

For example, Patent Literature 2 discloses a dielectric ceramic composition whose primary constituent is $(Ba_{1-x}Ca_x)_m(Ti_{1-y}Zr_y)O_3$ (also referred to as "BCTZ"), average crystal grain size after sintering is 0.15 to 0.51 μm, and grain distribution based on the 100% equivalent dielectric grain size less the 50% equivalent size is 0.3 to 0.9 μm. The specific dielectric constant of the dielectric ceramic composition disclosed therein is 1651 or less.

PRIOR ART LITERATURE

Patent Literature

Patent Literature 1: Japanese Patent Laid-open No. 2010-180124

Patent Literature 2: Japanese Patent Laid-open No. 2006-282483

SUMMARY OF THE INVENTION

Problems to be Solved by the Invention

As described above, it is desired that, to achieve good electrical insulation property, voltage endurance characteristics, life, etc., with a multi-layer ceramic capacitor, the size of the dielectric grain is made as fine as possible to keep the surface of the dielectric layer flat and any surface irregularity of the internal electrode is minimized. On the other hand, making the grain size of the dielectric layer excessively fine presents a trade-off problem in that it causes the dielectric constant to drop due to the sizing effect mentioned above.

The present invention was developed to solve the aforementioned problem, and its object is to provide a multi-layer ceramic capacitor that achieves large capacitance and improved reliability at the same time by growing the dielectric grains constituting the dielectric layer in an as-uniform-as-possible manner through sintering to keep the surface of the layer flat, and also by ensuring a certain range of grain size and consequently sufficient dielectric constant, as well as a method of manufacturing such multi-layer ceramic capacitor.

Means for Solving the Problems

The present invention is a multi-layer ceramic capacitor constituted by dielectric layers and internal electrode layers alternately layered with one another, wherein a dispersion, nd, of average grain size of dielectric grains constituting the dielectric layers (a value (D90/D10) obtained by dividing D90 which is a grain size including 90% cumulative abundance of grains by D10 which is a grain size including 10% cumulative abundance of grains) is smaller than 4.

In addition, preferably the dielectric layer does not contain Mg, but it may contain 0.03 mol or less of Mg per 100 mol of $BaTiO_3$.

In addition, preferably the dielectric layer may contain 0.01 mol or more but 0.03 mol or less of Mg per 100 mol of $BaTiO_3$.

In addition, preferably the average size of the dielectric grains is greater than 300 nm but smaller than 1000 nm.

Additionally, the present invention is a method of manufacturing a multi-layer ceramic capacitor comprising: a step to prepare a dielectric material powder whose average grain size is 200 nm or less and preferably 80 nm or greater; and a step to sinter the dielectric material powder in such a way that the dispersion of average grain size nd of the dielectric grains constituting the dielectric layer becomes smaller than 4 and the average size of the dielectric grains becomes greater than 300 nm but smaller than 1000 nm.

Effects of the Invention

According to the present invention, the surface of the dielectric layer can be kept flat to some extent by uniformly growing the dielectric grains constituting the dielectric layer in such a way that their dispersion of average grain size nd takes a value smaller than 4. This way, relatively high life characteristics can be obtained. At the same time, sufficient size of the dielectric grains can be ensured to achieve a high specific dielectric constant. As a result, the multi-layer ceramic capacitor can achieve large capacitance and improved reliability at the same time.

MODES FOR CARRYING OUT THE INVENTION

Figure 1:
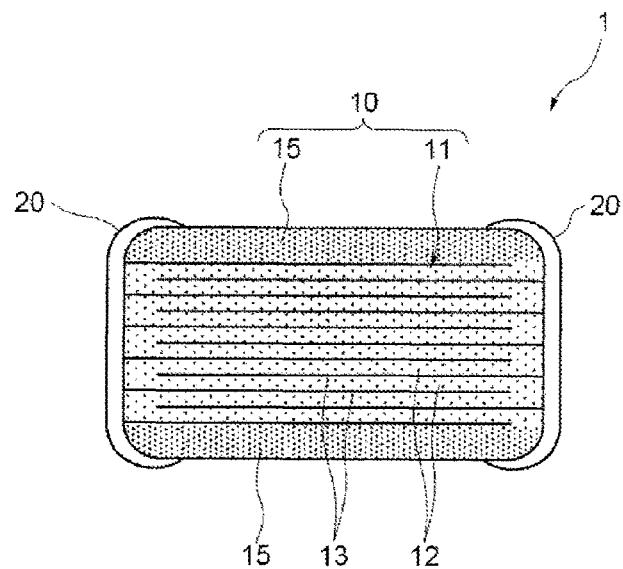
FIG. 1 is a schematic longitudinal section view of a multi-layer ceramic capacitor according to an embodiment of the present invention.

A multi-layer ceramic capacitor according to an embodiment of the present invention is explained below. FIG. 1 is a schematic longitudinal section view of a multi-layer ceramic capacitor 1. The multi-layer ceramic capacitor 1 is generally constituted by a ceramic sintered compact 10 of specified chip size and shape (such as rectangular solid of 1.0×0.5×0.5 mm) as well as a pair of external electrodes 20 formed on both sides of the ceramic sintered compact 10. The ceramic sintered compact 10 is made of $BaTiO_3$ (barium titanate) as its primary constituent, for example, and has a laminate 11 inside which is constituted by dielectric layers 12 and internal electrode layers 13 alternately layered with one another, as well as cover layers 15 formed as the outermost layers.

The laminate 11 has a high-density multi-layer structure where the thickness of one dielectric layer 12 sandwiched by two internal electrode layers 13 is 1 μm or less and there are hundreds of layers in total according to the specifications of electrostatic capacitance, required voltage endurance, etc. The cover layers 15 formed in the outermost parts of the laminate 11 protect the dielectric layers 12 and internal electrode layers 13 from humidity, contaminants and other contaminating substances from the exterior and prevent the layers from deteriorating over time.

The multi-layer ceramic capacitor 1 is manufactured as follows, for example. First, a material powder whose primary constituent is $BaTiO_3$ and grain size is 200 nm or less is wet-mixed with additive compounds, after which the mixture is dried and pulverized to prepare a dielectric material powder. Here, the quantity of MgO to be blended into the dielectric material powder may be such that the content of Mg becomes 0.01 mol or more but 0.03 mol or less per 100 mol of $BaTiO_3$. It is also possible to not add any MgO so that the content of Mg becomes 0.

The prepared dielectric material powder is wet-mixed with polyvinyl acetal resin and organic solvent, after which the mixture is applied to form a band-shaped dielectric green sheet of 1 μm or less according to the doctor blade method, for example, and then dried. Thereafter, a conductive paste containing organic binder is screen-printed onto the surface of the dielectric green sheet to place an internal electrode layer 13 pattern. For the conductive paste, a metal powder of Ni is favorably used, for example. It is also possible to uniformly disperse $BaTiO_3$ of 50 nm or less in grain size, as a co-material.

Thereafter, a specified number of dielectric green sheets that have been stamped to a uniform size of 15 cm×15 cm, for example, are layered in such a way that the internal electrode layers 13 are staggered. Cover sheets that will become cover layers 15 are then pressure-bonded at the top and bottom of the layered dielectric green sheets and the layers are cut to a specified chip size (such as 1.0×0.5 mm), after which a conductive paste that will become external electrodes 20 is applied on both sides of the laminate and then dried. This way, a compact of multi-layer ceramic capacitor 1 is obtained.

The compact thus obtained is put in a N2 ambience of approx. 350° C. to remove the binder, and then sintered for 10 minutes to 2 hours at 1220 to 1280° C. using a mixed gas of $N_2$, $H_2$ and $H_2O$ (where the partial oxygen pressure is approx. $1.0×10^{-11}$ MPa). After the sintering, the compact is oxidized for approx. 1 hour in a $N_2$ ambience of approx. 1000° C., to obtain a multi-layer ceramic capacitor 1 whose dielectric-layer-constituting dielectric grains have been grown to a desired grain size (diameter of sintered dielectric grain).

Figure 2:
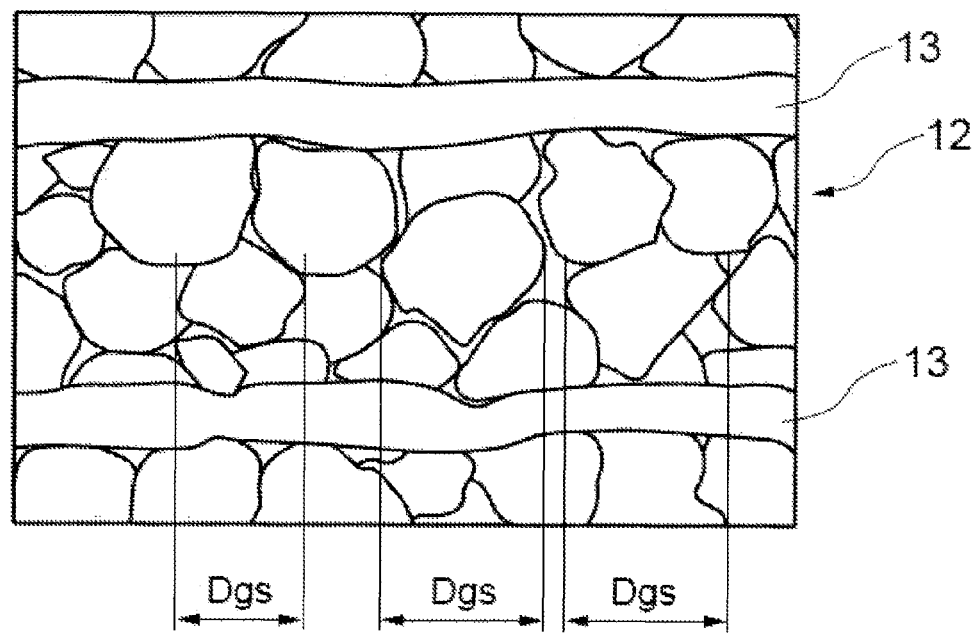
FIG. 2 is a section view of a dielectric layer presented to explain the grain size.
Figure 3:
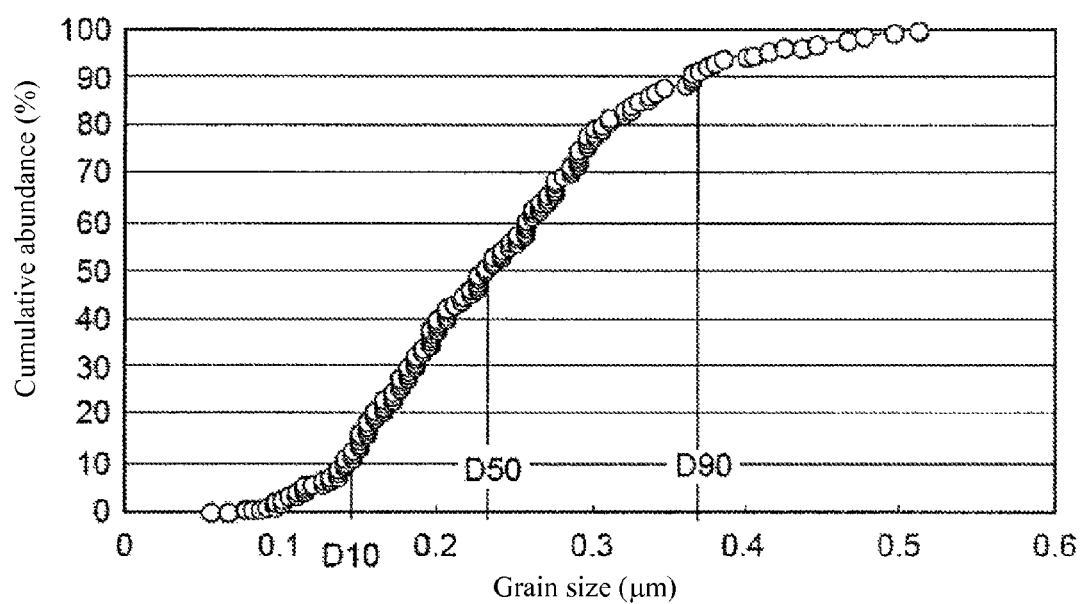
FIG. 3 is a graph showing the relationship between the dielectric grain size and cumulative abundance, in order to explain the dispersion of average grain size nd.

FIG. 2 is a schematic section view of the dielectric layer 12 of the multi-layer ceramic capacitor 1. In this Specification, the grain size Dg is defined as the average of maximum lengths Dgs of sintered dielectric grains measured in the direction parallel with the internal electrode layer (i.e., direction orthogonal to the direction of electric field). In other words, the grain size Dg can be obtained by dividing the total sum of the maximum lengths Dgs of sampled dielectric grains, by the number of sampled grains, by referring to FIG. 2. As for sampling of dielectric grains for the purpose of measuring the grain size Dg, the sample size should be 500 or more and if there are 500 or more grains in one observed area (such as on one SEM photograph taken at 2000 magnifications), all dielectric grains in the area are sampled; if there are fewer than 500 grains, multiple locations are observed (captured) until there are at least 500 grains. On the other hand, FIG. 3 is a graph showing the relationship between the sizes of sintered dielectric grains observed in the sample dielectric layer 12 on one hand, and the cumulative abundance on the other which is obtained by accumulating such sizes from the smallest grain size, in order to explain the dispersion of average grain size nd of dielectric grains. Here, the dispersion, nd, of average grain size is defined as a value obtained by dividing D90 which is a grain size including 90% cumulative abundance of grains by D10 which is a grain size including 10% cumulative abundance of grains, or by Formula (1) below:

$$nd = D90/D10 \qquad \text{Formula (1)}$$

According to Formula (1), the smaller the dispersion of average grain size nd, the more uniform the sizes of dielectric grains are and the flatter the surface of the dielectric layer 12 is. In the above, nd approaches 1 as the grain sizes become more uniform.

Preferably the dielectric grains constituting the dielectric layer 12 of the multi-layer ceramic capacitor 1 in this embodiment have a uniformity evidenced by a dispersion of average grain size nd smaller than 4. By uniformly sintering the dielectric grains, the surface of the dielectric layer 12 can be flattened and any surface irregularity at the boundary with the internal electrode layer 13 can be reduced. This way, concentration of electric field at projected parts of the electrode can be prevented to achieve higher reliability. In addition, preferably the grain size of the dielectric layer 12 is greater than 300 nm but smaller than 1000 nm (1 μm). This way, relatively large grain sizes can be ensured and high specific dielectric constant achieved even with a dielectric layer 12 of 1 μm or less.

According to the multi-layer ceramic capacitor 1 in this embodiment, a specific dielectric constant of 5000 or greater, as well as high life characteristics of 25 hours or longer as demonstrated by the accelerated life test conducted under conditions of 150° C. and 8.5 V/μm, can be obtained by growing the dielectric grains under the conditions explained below.

Examples

Next, examples of the multi-layer ceramic capacitor (hereinafter referred to as "MLCC") proposed by the present invention are explained.

<Production of MLCC>
(1) Preparation of Dielectric Material Powder

First, to prepare a material powder for dielectrics, a high-purity $BaTiO_3$ powder of 80 to 280 nm in average grain size was weighed, along with compounds including 0.5 mol of $HoO_{3/2}$, 0.5 mol of $SiO_2$, 0.1 mol of $MnCO_3$ (becomes MnO as $CO_2$ dissociates when sintered), 0.1 mol of $V_2O_5$, 0.1 mol of $ZrO_2$, and 0 to 0.04 mol of MgO, per 100 mol of $BaTiO_3$. The average grain size of the material powder can be obtained by observing 500 powder samples of barium titanate using an SEM and taking the median size of the observed samples. Then, the material powder for each of the samples shown in Tables 1 to 3 was wet-mixed with water, after which the mixture was dried and dry-pulverized to prepare a dielectric material powder. A dielectric material powder for cover layers was also prepared using similar constituent compounds.

(2) Production of MLCC Compact

The prepared dielectric material powder was wet-mixed with polyvinyl acetal resin and organic solvent, after which the mixture was applied to form a ceramic green sheet of 1.0 μm in thickness according to the doctor blade method and then dried. Ceramic cover sheets for cover layers were prepared at a thickness of 10 μm. A Ni conductive paste was screen-printed onto the green sheet that would become a dielectric layer, according to a specified pattern, to place an internal electrode. One hundred and one such green sheets having an electrode pattern placed on them were layered so that the number of dielectric layers n became 100, and then 20 cover sheets of 10 μm in thickness each were pressure-bonded at the top and bottom of the laminate, respectively, after which the laminate was cut to 1.0×0.5 mm. Thereafter, a Ni conductive paste that would become external electrodes was applied on both sides of the laminate and then dried, to obtain a sample of MLCC compact.

(3) Sintering of MLCC Compact

The sample of MLCC compact was put in a $N_2$ ambience of approx. 350° C. to remove the binder. Thereafter, the sample was sintered for 10 minutes to 2 hours at 1220 to 1280° C. using a mixed gas of $N_2$, $H_2$ and $H_2O$ (where the partial oxygen pressure was approx. $1.0 \times 10^{-11}$ MPa). The sintering temperature and time were adjusted as deemed appropriate to achieve the target grain size. After the sintering, the compact was oxidized for 1 hour in a $N_2$ ambience of 1000° C.

<MLCC Evaluation Methods>
(1) Method of Evaluation of Grain Size

A partial section of the MLCC was polished and extracted, and based on a photograph capturing a section of the dielectric layer using a scanning electron microscope (SEM), the grain sizes of dielectric grains were measured. Here, the maximum lengths Dgs of 500 sampled dielectric grains were measured by image analysis based on SEM photographs, and the average of obtained maximum lengths was evaluated as the grain size Dg. To clearly capture the grain boundary line on the SEM photograph, prior heat treatment was applied at 1180° C. for 5 minutes in the same ambience as in the sintering process (mixed gas of $N_2$, $H_2$ and $H_2O$) to thermally etch the grain interface.

(2) Method of Evaluation of Grain Size Dispersion

Based on the cumulative abundance characteristics (refer to FIG. 3) obtained from the grain size data of at least 500 dielectric grains sampled on a section photograph of the dielectric layer taken with a scanning electron microscope (SEM), the dispersion of average grain size nd was calculated using Formula (1) above. The sample size should be 500 or more and if there were 500 or more grains on one section photograph, all dielectric grains on the photograph were sampled; if there were fewer than 500 grains, sampling was done on a section photograph(s) of another part(s) until the number of grains came to at least 500.

(3) Method of Evaluation of Dielectric Constant

The sintered and oxidized MLCC was put in a thermostatic chamber of 150° C. and kept stationary for 1 hour, and then removed and kept stationary at room temperature of 25° C. for 24 hours to adjust the conditions, after which its capacitance Cm was measured using an impedance analyzer. Voltage was applied under the condition of 1 kHz and 1.0 Vrms for measurement. The specific dielectric constant $\in$ was obtained from the measured capacitance Cm using Formula (2) below:

$$Cm = \in \times \in_0 \times n \times S/t \qquad \text{Formula (2)}$$

Here, $\in_0$ represents the dielectric constant in vacuum, while n, S, and t represent the number of dielectric layers, area of internal electrode layers, and thickness of one dielectric layer, respectively.

(4) Method of Evaluation of Life Characteristics

The sintered and oxidized MLCC was put in a thermostatic chamber of 150° C. and kept stationary for 1 hour to adjust the conditions, after which the MLCC was put in a thermostatic chamber environment of 150° C. in temperature and 8.5 V/μm in electric field intensity (voltage of 6 VDC at a dielectric layer thickness of 0.7 μm). The MLCC was evaluated for life characteristics based on the accelerated life time, which is defined as the average time it takes for the leak current of the MLCC to become 100 times the initial leak current.

<MLCC Evaluation Results>

The evaluation results of the dielectric layers of the MLCCs produced according to the aforementioned conditions are explained by referring to Tables 1 to 3.

(1) Samples 1 to 12

TABLE 1

| Sample No. | Mg (mol) | Material grain size (nm) | Grain size of sintered compact (nm) | nd Grain size dispersion (−) | ε Specific dielectric constant (−) | Accelerated life (h) | *: Out of specification (Reference example) |
|---|---|---|---|---|---|---|---|
| 1 | 0 | 110 | 314 | 2.6 | 8413 | 29 | |
| 2 | 0 | 110 | 315 | 3.0 | 7163 | 28 | |
| 3 | 0.01 | 110 | 311 | 2.9 | 6849 | 33 | |
| 4 | 0.01 | 110 | 312 | 3.1 | 6234 | 31 | |
| 5 | 0.02 | 110 | 315 | 3.1 | 6321 | 30 | |
| 6 | 0.02 | 110 | 311 | 3.5 | 6211 | 29 | |
| 7 | 0.03 | 110 | 312 | 3.7 | 5699 | 27 | |
| 8 | 0.03 | 110 | 298 | 3.6 | 5680 | 29 | |
| 9 | 0.03 | 110 | 322 | 3.3 | 5396 | 26 | |
| 10 | 0.04 | 110 | 289 | 4.3 | 4703 | 22 | * Mg too much |
| 11 | 0.04 | 110 | 287 | 4.2 | 4697 | 20 | * Mg too much |
| 12 | 0.04 | 110 | 320 | 4.4 | 4440 | 18 | * Mg too much |

Samples 1 to 12 represent examples where the material grain size of $BaTiO_3$ before sintering was 110 nm and its grains were grown toward a target grain size of approx. 300 nm. Mg (magnesium) was added by a quantity range of 0 to 0.04 mol per 100 mol of $BaTiO_3$.

In Samples 1 to 9, the specific dielectric constant $\epsilon$ was greater than 5000 and accelerated life was 25 hours or longer when the content of Mg was 0.03 mol or less. The dielectric grains were also uniform, as evidenced by a dispersion of average grain size nd of less than 4. In Samples 10 to 12 containing Mg by 0.04 mol, the specific dielectric constant $\epsilon$ was less than 5000, accelerated life was shorter than 25 hours, and dispersion of average grain size nd was greater than 4.

(2) Samples 13 to 17

Samples 13 to 17 represent examples where the material grain size of $BaTiO_3$ before sintering was 80 to 280 nm and no Mg was added. In all samples, the dispersion of average grain size nd was 4 or smaller.

In Samples 13 to 15 with a $BaTiO_3$ material grain size of 80 to 200 nm, the specific dielectric constant $\epsilon$ was greater than 5000 and accelerated life was 25 hours or longer. In Samples 16 and 17 with a material grain size of 250 to 280 nm, the accelerated life was shorter than 25 hours.

TABLE 2

| Sample No. | Mg (mol) | Material grain size (nm) | Grain size of sintered compact (nm) | nd Grain size dispersion (−) | ε Specific dielectric constant (−) | Accelerated life (h) | *: Out of specification (Reference example) |
|---|---|---|---|---|---|---|---|
| 13 | 0 | 80 | 361 | 3.5 | 8676 | 25 | |
| 1 | 0 | 110 | 314 | 3.2 | 8413 | 29 | |
| 14 | 0 | 150 | 334 | 2.8 | 7928 | 34 | |
| 15 | 0 | 200 | 307 | 2.7 | 5226 | 33 | |
| 16 | 0 | 250 | 338 | 3.6 | 7883 | 12 | * Material size too large |
| 17 | 0 | 280 | 354 | 3.9 | 8749 | 6 | * Material size too large |

(3) Samples 18 to 26

TABLE 3

| Sample No. | Mg (mol) | Material grain size | Grain size of sintered compact (nm) | nd Grain size dispersion (−) | ε Specific dielectric constant (−) | Accelerated life (h) | *: Out of specification (Reference example) |
|---|---|---|---|---|---|---|---|
| 18 | 0 | 110 | 286 | 2.9 | 4656 | 33 | * Grain size too small |
| 1 | 0 | 110 | 314 | 3.3 | 8413 | 29 | |
| 19 | 0 | 110 | 684 | 3.1 | 11848 | 30 | |
| 20 | 0 | 110 | 990 | 3.0 | 12129 | 26 | |
| 21 | 0 | 110 | 1018 | 4.2 | 12077 | 8 | * Grain size too large |
| 22 | 0 | 200 | 273 | 2.7 | 4266 | 37 | * Grain size too small |
| 23 | 0 | 200 | 457 | 3.2 | 11485 | 32 | |
| 24 | 0 | 200 | 538 | 3.3 | 12202 | 28 | |
| 25 | 0 | 200 | 884 | 3.5 | 12682 | 25 | |
| 26 | 0 | 200 | 1045 | 4.5 | 11554 | 5 | * Grain size too large |

Samples 18 to 21 represent examples where the material grain size of BaTiO$_3$ was 110 nm, while Samples 22 to 26 represent examples where the material grain size of BaTiO$_3$ was 200 nm and its grains were grown toward a target grain size of 300 nm to 1000 nm. Mg was not added.

In Samples 1, 19, 20 and 23 to 25 whose grain size after sintering was greater than 300 nm but smaller than 1000 nm, the specific dielectric constant ∈ was greater than 5000 and accelerated life was 25 hours or longer. The dielectric grains were also uniform, as evidenced by a dispersion of average grain size nd of less than 4.

In Samples 18 and 22, the grain size after sintering was smaller than 300 nm and specific dielectric constant was smaller than 5000. In Samples 21 and 26, the grain size was greater than 1000 nm, dispersion of average grain size nd was greater than 4, and accelerated life was shorter than 25 hours.

DESCRIPTION OF THE SYMBOLS

1 Multi-layer ceramic capacitor
10 Ceramic sintered compact
11 Laminate
12 Dielectric layer
13 Internal electrode layer
15 Cover layer
20 External electrode

The invention claimed is:

1. A multi-layer ceramic capacitor constituted by sintered dielectric layers and internal electrode layers alternately layered with one another, wherein dielectric grains constitute a sintered grain body which forms the sintered dielectric layers, and a dispersion, nd, of average grain size of the dielectric grains (a value (D90/D10) obtained by dividing D90 which is a grain size including 90% cumulative abundance of grains by D10 which is a grain size including 10% cumulative abundance of grains) is smaller than 4, said dielectric grains being sintered and grown to an average size greater than 300 nm but smaller than 1000 nm.

2. A multi-layer ceramic capacitor according to claim 1, wherein the dielectric layer does not contain Mg.

3. A multi-layer ceramic capacitor according to claim 2, wherein an average size of the dielectric grains is greater than 300 nm but smaller than 1000 nm.

4. A multi-layer ceramic capacitor according to claim 1, wherein the dielectric layer contains 0.03 mol or less of Mg per 100 mol of BaTiO$_3$.

5. A multi-layer ceramic capacitor according to claim 4, wherein the dielectric layer contains 0.01 mol or more but 0.03 mol or less of Mg per 100 mol of BaTiO$_3$.

6. A multi-layer ceramic capacitor according to claim 5, wherein an average size of the dielectric grains is greater than 300 nm but smaller than 1000 nm.

7. A multi-layer ceramic capacitor according to claim 4, wherein an average size of the dielectric grains is greater than 300 nm but smaller than 1000 nm.

8. A multi-layer ceramic capacitor according to claim 1, wherein the multi-layer ceramic capacitor has an accelerated life of 25 hours or longer as measured by an accelerated life test conducted under conditions of 150° C. and 8.5 V/µm.

9. A multi-layer ceramic capacitor according to claim 1, wherein the multi-layer ceramic capacitor has a specific dielectric constant of 5000 or greater.

10. A method of manufacturing a multi-layer ceramic capacitor comprising:
   a step to prepare a dielectric material powder whose average grain size is 200 nm or less, and
   a step to sinter the dielectric material powder in such a way that a dispersion of average grain size nd (grain size D90 equivalent to 90% cumulative abundance divided by grain size D10 equivalent to 10% cumulative abundance (D90/D10)) of dielectric grains constituting a dielectric layer becomes smaller than 4, and an average size of the dielectric grains becomes greater than 300 nm but smaller than 1000 nm.

11. A method of manufacturing multi-layer ceramic capacitor according to claim 10, wherein an average grain size of the dielectric material powder is 80 nm or greater but 200 nm or smaller.

* * * * *